United States Patent [19]
Glaros et al.

[11] 3,816,842
[45] June 11, 1974

[54] CAMERA STRUCTURE

[75] Inventors: Theodore J. Glaros, Bloomington; Roland L. Hron; George E. Pribyl, both of Minneapolis, all of Minn.

[73] Assignee: Cir-Tech, Inc., Columbia Heights, Minn.

[22] Filed: Aug. 16, 1972

[21] Appl. No.: 281,202

[52] U.S. Cl. ............... 95/31 R, 352/172, 355/64
[51] Int. Cl. ............................................. G03b 19/04
[58] Field of Search .............. 95/44, 86, 31; 355/64; 352/172

[56] References Cited
UNITED STATES PATENTS

| | | | |
|---|---|---|---|
| 1,090,128 | 3/1914 | Avers | 352/172 |
| 1,957,889 | 5/1934 | Hopkins | 355/64 |
| 2,095,815 | 10/1937 | Hopkins | 95/44 C |
| 2,391,274 | 12/1945 | Schubert | 355/64 |
| 2,419,836 | 4/1947 | Holbrook | 355/64 |
| 2,461,185 | 2/1949 | Schubert | 355/64 |
| 2,537,529 | 1/1951 | Hessert | 355/64 |
| 2,676,513 | 4/1954 | Engstrom | 355/64 |
| 2,726,834 | 12/1955 | Hoge | 95/86 X |

Primary Examiner—John M. Horan
Attorney, Agent, or Firm—Merchant, Gould, Smith & Edell

[57] ABSTRACT

An automatic camera for simultaneously taking the picture of an individual and information with which the individual is identified. The camera is adapted to receive a roll of film on a supply reel, the film being threaded through a lens and shutter mechanism and received by a take up reel. Following actuation of the shutter mechanism to take the picture, the film is automatically advanced to a new exposure position. To insure that actuation of the shutter mechanism will always result in taking a usable picture, the camera includes means for determining when a sufficient length of new film has been wound on to the take up reel and for precluding camera operation before that time. Similarly, means are included for sensing the amount of film left on the supply reel, for generating an alarm when a predetermined amount of film remains, and for precluding camera operation when the end of the film roll is approached.

25 Claims, 14 Drawing Figures

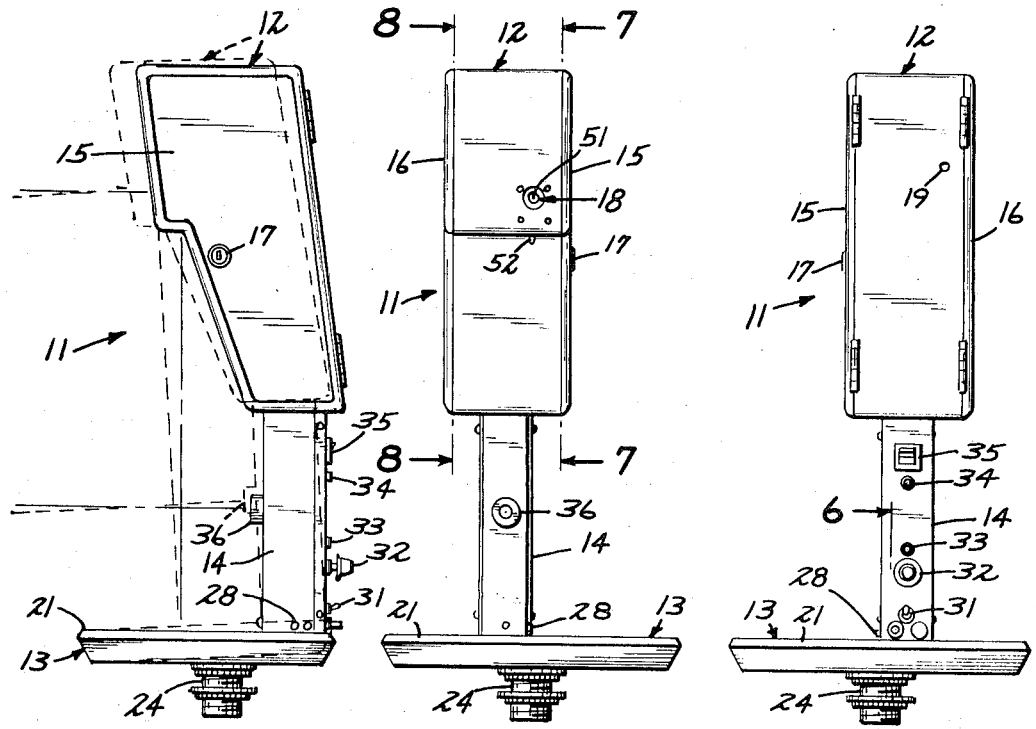
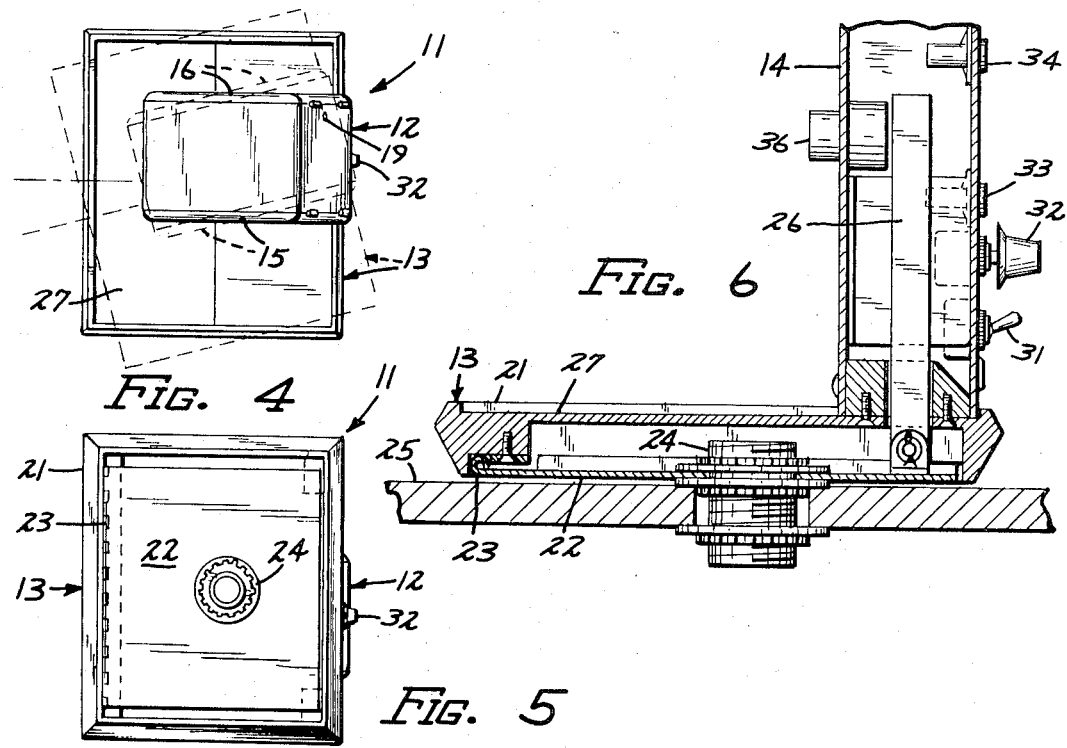

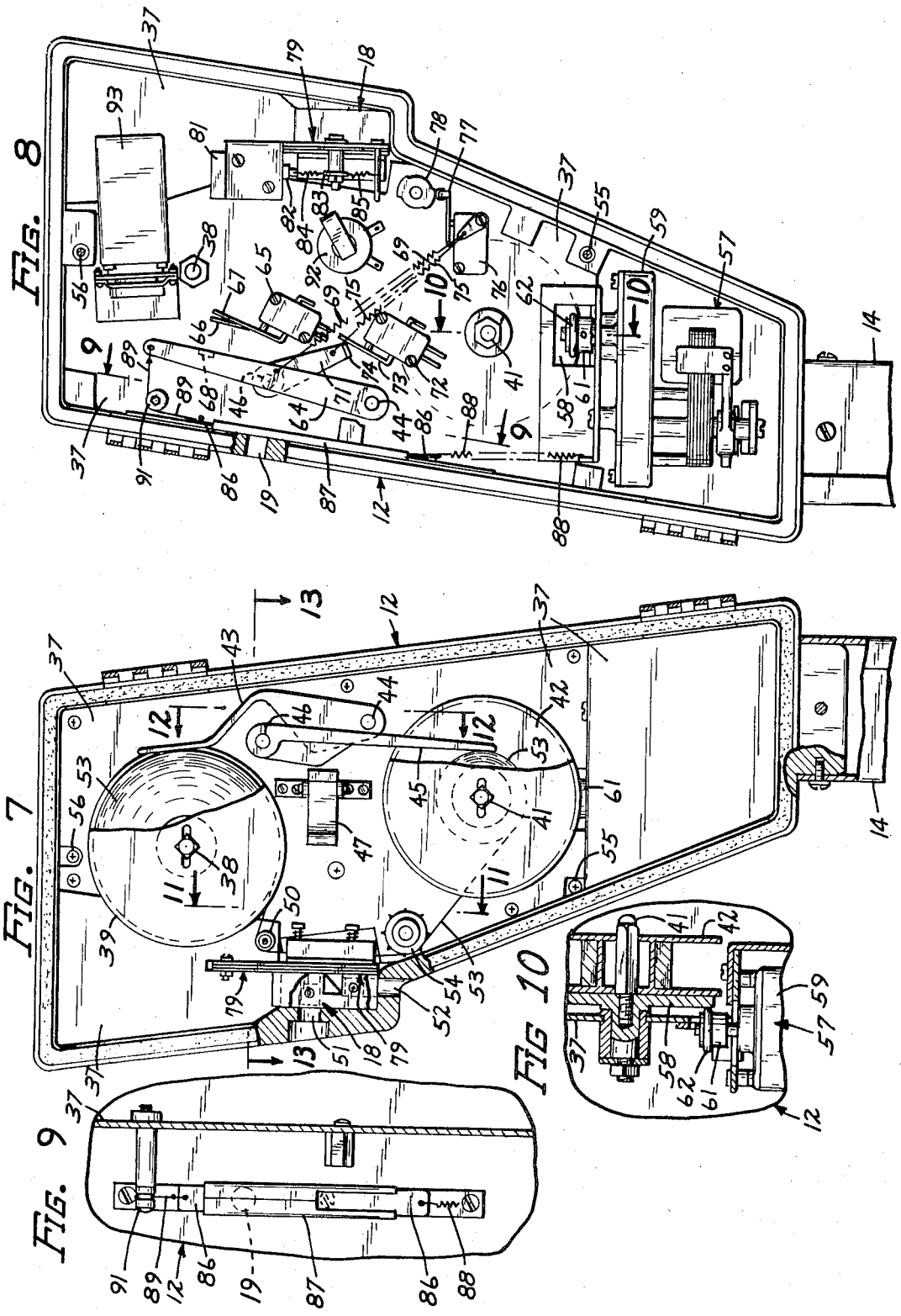

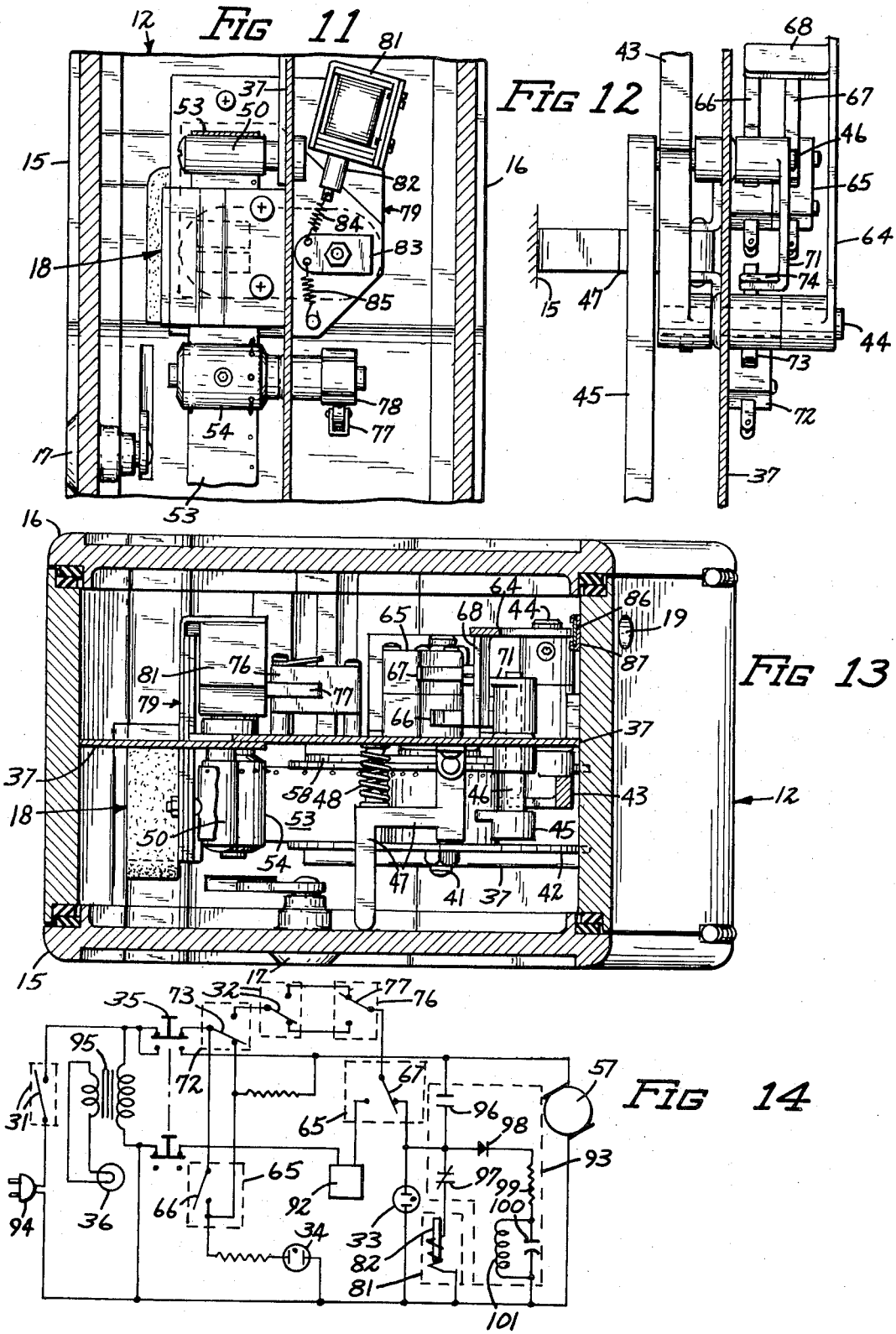

CAMERA STRUCTURE

The invention is related generally to the camera art, and is specifically directed to a dual lens camera having an automatic film advance mechanism.

Cameras of this type are particularly useful to businesses which provide check cashing services. If, at the time a check is cashed, a picture is taken of the individual cashing the check and information relating to the individual (e.g., a drivers license or credit card), there will be a much greater chance of subsequently locating the individual in the event that the check was drawn on an account with insufficient funds or fraudulently drawn. Further, if the business is systematic in obtaining such an identification for every check that is cashed, this procedure will serve as a deterrent to persons who may be motivated to cash improper checks.

Obviously, it is essential to the business owner that a usable picture results from each operation of the camera. This is not, however, been the case with prior art devices. For example, it is well known by those proficient in the use of cameras that a new roll of film must be advanced a predetermined amount before a usable portion reaches the lens and shutter mechanism. The difficulty arises in that persons who operate cameras of this type are not necessarily proficient in or knowledgeable of camera operation. Further, even though the operator may realize that the film must be advanced such a predetermined amount, the camera does not tell him what the amount may be or when the film has reached a usable position. If the new film has not been advanced sufficiently, the result is no picture or an unusable picture.

The same problem arises when the film begins to run out or does in fact run out. Existing cameras include only a sight gauge to warn of a low remaining film supply, and this is totally inadequate in estimating the point at which the film becomes unusable. It is entirely possible with existing cameras to take pictures for an extended period of time with no usable film left in the camera. In this case, the entire objective of the camera is lost except for what deterrent value it may have in operating while empty.

A further problem with cameras presently used is their inability to adapt to persons of different size. Cameras presently in use are rigidly and nonadjustably mounted to a counter or the like and must, therefore, be dependent on a subject field large enough to encompass persons of all height. It will be appreciated that a person whose intent is to cash an improper check may be similarly motivated to remove himself from the scope of the camera without the operator's knowledge. This, too, can result in a picture which cannot fully identify the check casher.

With these problems in mind, we have invented an improved camera which automatically advances the film roll after each picture is taken, and which either annunciates an alarm condition or precludes camera operation when usable film is not in picture taking position. We accomplish this by sensing the amount of film on a take up reel and thereby insuring that a sufficient length of new film has been wound thereon before permitting camera operation; and by sensing the amount of film remaining on a supply reel to first respond with a warning signal when the film supply is low, and to preclude camera opertion after the film has been advanced a further amount.

The camera is mounted on a pedestal which swivels to permit swinging movement to either side for lateral adjustment, and which is hinged to permit the camera to adjustably tilt for persons of different height. An aiming light is also included which, when it strikes the individual's chest, insures the camera operator that the individual is within the field or scope of the camera.

The supply and take up reel sensors not only help the operator to know when usable film is in picture taking position, but also help to take advantage of all usable film on each roll. For example, a standard 100 foot roll of film may vary in actual length from 95 to 110 feet, and our sensing mechanism causes the camera to begin operation as soon as a sufficient length of film leader has been wound onto the take up reel, and allows operation to continue until just before the film supply is exhausted. In this manner, a maximum number of pictures can be obtained from any roll of film notwithstanding its length or variance from a standard length.

BRIEF DESCRIPTION OF THE DRAWINGS

FIG. 1 is a side elevational view of an automatic camera embodying the inventive principle;

FIG. 2 is a front elevational view of an automatic camera;

FIG. 3 is a rear elevational view of the camera;

FIG. 4 is a view in top plan of the camera;

FIG. 5 is a view in bottom plan of the camera;

FIG. 6 is an enlarged sectional view of a pedestal support for the camera, taken generally along the line 6—6 of FIG. 3;

FIG. 7 is an enlarged sectional view of the camera taken along the line 7—7 of FIG. 2;

FIG. 8 is an enlarged sectional view of the camera taken along the line 8—8 of FIG. 2;

FIG. 9 is a fragmentary sectional view of a film supply gauge taken along the line 9—9 of FIG. 8;

FIG. 10 is a fragmentary sectional view of driving means for the film advancing mechanism of the camera, taken along the line 10—10 of FIG. 8;

FIG. 11 is a partial sectional view taken along the line 11—11 of FIG. 7;

FIG. 12 is a partial sectional view taken along the line 12—12 of FIG. 7;

FIG. 13 is an enlarged sectional view taken along the line 13—13 of FIG. 7; and

FIG. 14 is a schematic diagram of a camera control circuit.

DESCRIPTION OF THE PREFERRED EMBODIMENT

Referring initially to FIGS. 1–6, a camera embodying the inventive principle is represented generally by the numeral 11. Camera 11 comprises a camera housing 12 which is supported by a pedestal support including a base 13 and an upright support 14.

As discussed in greater detail below, camera housing 12 is divided by a partition member into two enclosures, each of which is accessible through hinged doors 15, 16, respectively. Door 15 includes a lock 17; and, as will be discussed in further detail below, door 16 can be opened only from the enclosure defined by door 15.

With particular reference to FIG. 2, a dual lens and shutter mechanism 18 is carried in the projecting face of camera housing 12 which permits it to simultaneously take a single picture of a subject immediately in front of the camera and an object disposed directly below. On the rear face of camera housing 12 (FIG. 3), an aperture 19 is formed through which a camera operator can estimate the amount of film remaining.

As best shown in FIGS. 5 and 6, base 13 consists of an upper member 21 and a lower member 22 which are pivotally connected along one edge by a hinge 23. The lower member 22 carries a swivel mechanism 24 which is adapted to project through a suitable opening in a counter top 25 or the like and thereby permit pivotal rotation of the camera 11. An upright member 26 is pivotally connected to the lower base member 22 to assist in tilting the camera 11 as discussed below. As shown in FIGS. 4–6, upper base member 21 is rectangular in shape and includes a recessed area 27 positioned below duel lens 18. The recessed area 27 is adapted to receive an information card or the like (e.g., driver's license, credit card, etc.) which identifies an individual, and actuation of the dual lens 18 simultaneously takes the picture of the individual and information card.

The bottom end of upright support 14 is rigidly affixed to the upper base member 21, as shown in FIG. 6, and the camera housing 12 is rigidly mounted on its upper end. Thus, it will be appreciated that camera housing 12, upright support 14 and the upper base member 21 comprise a rigid unit which is tiltably movable about the hinge 23 with respect to the lower base member 22 and counter top 25. This tilting movement is also relative to the upright member 26 which projects into the upright support 14 but pivotally moves with it to permit varying degrees of tilting adjustment (see the dotted line position of FIG. 1). The camera can be held in a desired tilt position by a set screw 28 (FIG. 3), which engages the upright member 26 in a manner not shown to preclude further tilting movement.

With reference to FIGS. 1–3 and 6, upright support 14 carries an on-off switch 31, an operate switch 32, a film advance indicating light 33, a low film supply warning light 34, a film advance switch 35 and an aiming light 36, the purpose, use and operation of each of which is explained in detail below.

The enlarged sectional representation of FIG. 7 shows the aforementioned partition, represented by the numeral 37, and one of the enclosures or compartments which it defines. A spindle 38, rotatably carried by the partition 37, is adapted to receive a supply reel 39 having a roll of unexposed film wound thereon. Similarly, a spindle 41 also rotatably mounted on the partition 37, receives a take up reel 42 which is rotated by a driving unit, as explained in greater detail below.

Operating in association with supply reel 39 is a sensing arm 43 which is pivotally mounted on the partition 37 by a pin 44. Sensing arm 43 is normally biased toward the center of reel 39 by a spring disposed in the opposite compartment, as discussed below. Thus, sensing arm 43 engages the roll of unexposed film and indicates the amount of film remaining by its current position.

A second sensing arm 45, also pivotally mounted on partition 37 by a pin 46, operates in association with the take up reel 42. Sensing arm 45 is also biased toward the center of reel 42 by a spring carried in the opposite compartment, and it is therefore capable of indicating the amount of exposed film wound onto take up reel 42 by its current position.

Each of the sensing arms 43, 45 includes a widened portion disposed for engagement by a disabling member 47. Referring additionally to FIGS. 12 and 13, disabling member 47 is pivotally mounted to the partition 37, which permits outward swinging movement to engage and move each of the arms 43, 45 entirely away from the respective reels 39, 42. Disabling member 47 is biased to such a disabling position by a spring 48, but it is normally rendered inoperative when it is engaged by the door 15 when it is closed (FIG. 13). It will be apparent, that when door 15 is opened, the spring 48 will swing the disabling member 47 outwardly into engagement with sensing arms 43, 45 to move them entirely away from the respective reels 39, 42. This enables the operator to remove an exposed roll of film and insert a new unexposed roll without having to hold the biased sensing arms away from an engaging position with one hand while removing or inserting reels with the other.

With continued reference to FIG. 7, the dual lens 18 is mounted in this compartment in a position which permits light to be received through an opening 51 in the camera housing 13. This enables a picture to be taken of a subject directly in front of camera 11. Similarly, an opening 52 is provided in housing 12 to permit the taking of a picture of an information card or the like disposed in the recessed area 27 of upper base member 21.

The film, represented by the numeral 53, is threaded from the supply reel 39 over an idler shaft 50, through the dual lens 18, past an idler wheel 54 and onto the take up reel 42. Wheel 54 is rotatably mounted on the partition 37 (see also FIG. 13), and preferably has a plurality of sprocket teeth positioned to project through the perforations of standard 16 millimeter film. It will be appreciated that the wheel 54 may be of a different configuration to cooperate with unperforated film, the sole objective being for the film 53 to rotate the wheel 54 without slippage therebetween. The purpose of wheel 54 is described below.

As pointed out above, the hinged door 16 can be opened only by gaining access to the compartment closed by door 15. As shown in FIG. 7, two locking screws 55, 56, disposed in this compartment, project through partition 37 and are threadably received by the door 56 (FIG. 8). Thus, removal of the screws 55, 56 unlocks the door 16 for access to the opposite compartment shown in FIG. 8.

With continued reference to FIG. 8, a motor unit 57 secured to the partition 37 serves to drive the take up spindle 41. With additional reference to FIG. 10, spindle 41 is affixed to and projects from a metallic driving disc 58. The motor unit 57 includes a gear reduction mechanism 59 which, through a drive shaft, rotates a driving drum 61. An O-ring 62 is carried in a peripheral groove of driving drum 61 frictionally engages the metallic driving disc 58 through a rectangular opening formed in the partition 37.

The pivot pin 44 upon which sensing arm 43 is mounted projects through partition 37 and into the compartment shown in FIG. 8. An actuating arm 64 is secured to the pivot pin 44 in this compartment so that it rotates with sensing arm 43 as film is unwound from the supply reel 39. A double pole microswitch 65 is secured to the partition 37 relative to actuating arm 64, the poles thereof being controlled by tripping arms 66, 67, respectively. As is shown, the tripping arm 66 normally assumes a position slightly closer to the actuating arm 64 so that one pole is thrown before the other. A finger 68 is affixed to actuating member 64 in a position to engage the tripping arms 66, 67 (FIG. 12). Actuating arm 64 is normally biased toward microswitch 65 by a coil spring 69, which also serves to bias sensing arm 43 toward the supply reel 39 as pointed out above. It will be appreciated that, as sensing arm 43 moves closer to the center of reel 39 as more unexposed film is used, the actuating arm 64 will move closer to the tripping arms 66, 67 and eventually engage them in sequence.

With continued reference to FIG. 8, a second actuating arm 71 is affixed to the pivot pin 46 for rotation with the sensing arm 45. A single pole microswitch 72 having a tripping arm 73 is fastened to the partition 37 for engagement by a finger 74 on the actuating arm 71 (FIG. 12). Actuating arm 71 is biased toward microswitch 72 by a coil spring 75, which also biases the sensing arm 45 toward the center of take up reel 42. Because sensing arm 45 initially occupies a position near the center of take up reel 42, actuating arm 71 normally engages the tripping arm 73 to actuate microswitch 72. After a predetermined amount of film has been wound onto the take up reel 42, sensing arm 45 moves radially outward a sufficient amount to cause the actuating arms 71 to disengage tripping arm 73.

A third microswitch 76 having a tripping arm 77 for its single pole, is fastened to the partition 37 relative to a cam wheel 78. Cam wheel 78 includes two lobes disposed 180° apart, and it is rotatably carried with the sprocket wheel 54. Thus, lineal movement of the film 53 from the supply reel 39 to the take up reel 42 rotates cam wheel 78 to effect a function described in further detail below.

The shutter mechanism portion of the dual lens 18 is represented by the numeral 79 in FIG. 8, and it too is mounted on the partition 37. With additional reference to FIG. 11, shutter mechanism 79 consists of a solenoid 81 having a plunger 82 which is connected to a pivotal actuating member 83 by a spring 84. A second spring 85 provides an opposing bias to the actuating member 83 to normally hold it in a first position. Current applied to the solenoid 81 actuates the plunger 82 to move the actuating member 83 to a second position which actuates the shutter mechanism 79 to take a picture in the known manner.

With reference to FIGS. 8 and 9, a film gauge 86 is positioned for movement relative to the aperture 19 to provide an additional indication of the amount of unexposed film remaining. Film gauge 86 consists of a short length of spring steel carrying suitable indicia, which is slidably carried in a stationary sleeve 87 affixed to the housing 12. The bottom end of gauge 86 is pulled downward by a coil spring 88, and its upper end is connected to a wire 89 that is drawn over a pulley 91 and connected to the upper end of actuating arm 64. Thus, as the sensing arm 43 and actuating arm 64 are rotated in response to a decreasing film supply, the film gauge 86 is drawn upwardly against the bias of spring 88 to indicate the amount of film remaining.

With continued reference to FIG. 8, a buzzer 92 and a relay 93 are also mounted on the partition 37, the purpose and function of which is discussed in connection with FIG. 14.

FIG. 14 is a schematic representation of the control circuit for camera 11. The circuit is adapted to receive power from a suitable source through a plug 94. The supply of power to the control circuit is controlled by on-off switch 31. Aiming light 36 receives power from a step-down transformer 95, and it is connected in the circuit to turn on any time the on-off switch 31 is closed.

The film advance switch 32 is a double pole, double throw switch having an "operate" position (shown) and a "load/unload" position. In the "operate" mode, it is possible for power to be supplied to a network including operate switch 32, microswitches 65, 72, 76 and relay 93 to control the several operational elements. Microswitch 65 essentially comprises two single pole, single throw switches which are represented by the tripping arm reference numerals 66 and 67, respectively.

Relay 93 comprises a set of normally open contacts 96, a set of normally closed contacts 97 and a conventional timing circuit including a diode 98, a resistor 99, a capacitor 100 and a relay coil 101 connected as shown. The function of the timing circuit is to reverse the position of contacts 96 and 97 (i.e., to make them closed and open, respectively) after the application of voltage for a predetermined length of time, the period of time being dependent on the parameter values of elements 99–101.

With film advance switch 35 in its "operate" position, the circuit function is controlled by the position of the several switches. As pointed out above, the position of microswitch 72 is controlled by the sensing arm 45, and it is adjusted to switch away from its normal position after approximately five feet of film have been wound onto the take up reel 42.

Operate switch 32 and microswitch 76 cooperate to initiate and terminate a cycle of camera operation. Operate switch 32 is a push-push switch which changes contact positions each time it is actuated. Microswitch 76 is controlled by the position of cam wheel 78, which is rotated by the sprocket wheel 54 as film 53 advances. Thus, with the operation of switch 32, power is supplied through microswitch 76 to the motor unit 57 (in a manner described more fully below), and as a result microswitch 76 is switched to the opposite position, thereby terminating the cycle.

The position of arm 67 of microswitch 65 determines whether power will be supplied to the relay 93, film advance indicating light 33 and motor unit 57 for a normal cycle of camera operation. Arm 67 is controlled by the position of sensing arm 43, which causes it to move from the position shown in FIG. 14 to an opposite position when the film supply on reel 39 decreases to less than approximately five feet. Arm 66 of microswitch 65 is also controlled by the position of sensing arm 43, and it switches from the open position shown in FIG. 14 to a closed position when the film supply decreases to 10 feet or less. Arm 66 controls the supply of power to low film supply warning light 34.

With film advance switch in the "load/unload" position, power is supplied directly to the warning light 34 and motor unit 57 as shown.

The first step of operation is loading the camera with a new roll of unexposed film. This is accomplished by unlocking a lock 17 and opening door 15. As door 15 is opened, sensing arms 43 and 45 are moved radially outward by the disabling member 47, which permits reel 39 (which contains the new roll of unexposed film) and the take up reel 42 to be mounted on their respective spindles 38, 41. The end of film 53 is threaded around idler wheel 50, through the dual lens 18, around the sprocket wheel 54 and onto the take up reel 42. Thereafter, door 15 is closed; and with the camera 11 plugged in, on-off switch 31 is closed to provide power to the control circuit. The initial length of film 53 is not suitable for exposure, and several feet must therefore be wound onto take up reel 42 to insure that each exposure will result in a suitable picture. Film advance switch 35 is therefore moved to its "load/unload" position, which provides power directly to the motor unit 57 and the warning light 34. It is necessary for the camera operator to know that the picture taking cycle cannot be initiated at any time when warning light 34 is on. As mentioned, light 34 is on continuously during the load/unload operation, and it is also turned on when advance switch 35 has been moved to its "operate" position and less than five feet of film is on the take up reel 42. This condition causes microswitch 72 to remain in the position shown in FIG. 14, which supplies power to warning light 34 and renders the camera cycling control portion of the circuit inoperable. Thus, if less than five feet of film have been wound onto the take up reel 42 during the load/unload operation, subsequent movement of the switch 35 to its "operate" position will simply light warning light 34. The operator can then return switch 35 to its "load/unload" position to further advance the film until five feet has been wound onto the take up reel 42, at which point microswitch 72 changes contact position. Subsequent movement of switch 35 to the "operate" position will then turn light 34 off, indicating to the operator that camera 11 is ready for operation.

When it is necessary to pictorially document a check cashing transaction, the camera operator places the check together with an identification card, such as a dirver's license, in the recessed area 27 of the upper base member 21. Camera 11 is then adjusted by swivelling and tilting until the light beam provided by aiming light 36 strikes the chest of the individual whose picture is being taken. This will insure that the individual is within the camera scope and that his picture will be properly taken. At this point, the operator depresses the push-push switch 32, which provides power to the relay 93 through microswitch 76 and 67. It is also to be observed that the film advance indicating light 33 is on during the entire cycle of operation.

Because contacts 97 are normally closed, power is immediately supplied to the solenoid 81 which operates the shutter mechanism 79 to simultaneously take the picture both of the individual and the identifying information. Contacts 96 are open when the cycle is initiated, thus precluding the motor unit 57 from operating at that time. Power is, however, supplied to the timing circuit; and after a predetermined moment of time has elapsed, relay 93 reverses the position of contacts 96 and 97. Power is thus removed from solenoid 81 to stop the shutter mechanism 89 and power is supplied to the motor unit 57 to advance the film 53 to the next unexposed frame. The film advancement continues until cam wheel 78 rotates an amount sufficient to move tripping arm 77 onto or off of one of its lobes (approximately 90°). This moves microswitch 76 to a position breaking the supply of power to motor unit 57, and advancement stops with the film in position for the next exposure.

This picture-taking cycle of operation is repeated in the same manner until approximately 10 feet of unexposed film remains on the supply reel 39. At this point, sensing arm 43 has moved radially inward toward the reel center an amount sufficient to trip arm 66 of microswitch 65, moving it to a closed position. This causes power to be supplied to the warning light 34, thus giving the camera operator a sufficient warning that the camera is beginning to run out of film. With this length of film remaining, it is still possible to take approximately 45-50 pictures. If five more feet of film are used, sensing arm 43 moves further radially inward and trips arm 67 of microswitch 65. The contact position of microswitch 65 is thus charged from the position shown in FIG. 14, breaking power communication to the controlling relay 93. In the new contact position, microswitch 67 closes that portion of the control circuit including buzzer 92, thus annunciating the fact that the film supply has been exhausted in addition to disabling further camera operation. To stop the buzzer 92, the advancing switch 35 must be moved to its "load/unload" position, which actuates the motor unit 57 to complete the winding of film onto take up reel 42. Switch 31 is then turned off, and door 15 is opened for removal of the exposed film roll and for loading and threading a new film roll.

We claim:

1. An automatic camera adapted for connection to a source of electrical power, comprising:
   a. a camera housing;
   b. mounting means for rotatably receiving a film supply reel and a take up reel;
   c. lens means;
   d. shutter means operable in association with the lens means to take a picture;
   e. electrical driving means operably connected to the mounting means for advancing film from the supply reel to the take up reel relative to the lens means;
   f. a rotatable control wheel disposed for essentially non-slipping engagement by the film as it moves from the supply reel to the take up reel, the control wheel including a cam portion;
   g. first switching means manually operable to establish contact between the source of electrical power and the electrical driving means;
   h. and second switching means engageable by said cam portion for breaking contact between the source of electrical power and the electrical driving means after a predetermined rotation of the control wheel.

2. The automatic camera defined by claim 1, and further comprising light means for producing a forwardly projecting light beam to properly aim the camera.

3. The automatic camera defined by claim 1, wherein the shutter means is electrically actuated, and further comprising timing circuit means operably connected to the first switching means for initially supplying power to the shutter means and for transferring the power to the electrical driving means after a predetermined period of time.

4. The automatic camera defined by claim 1, wherein:
   a. the mounting means comprises
      1. a rotatable spindle adapted to receive the take up reel;
      2. and a drive disc carried by the spindle;

b. and the electrical driving means comprises
1. a drive wheel mounted for rotation about an axis essentially perpendicular to that of the drive disc and disposed in driving engagement therewith;
2. and electric motor means for rotating the drive wheel.

5. The automatic camera defined by claim 4, wherein the drive wheel includes a peripheral groove in which an O-ring is disposed, the O-ring constructed and arranged to frictionally engage the drive disc.

6. The automatic camera defined by claim 1, and further comprising support means for tiltably adjustably mounting the camera on a supporting surface.

7. The automatic camera defined by claim 1, wherein the support means further comprises means for rotationally adjusting the camera with respect to said supporting surface.

8. The automatic camera defined by claim 1, and further comprising control means for sensing the amount of film on the take up reel and for precluding operation of the shutter means until a predetermined amount has been wound thereon.

9. The automatic camera defined by claim 8, wherein the control means also precludes operation of the automatic film advancing means until said predetermined amount of film has been wound onto the take up reel.

10. The automatic camera defined by claim 9, wherein the shutter means is electrically actuated, and the control means comprises:
a. a sensing arm pivotally mounted on the camera housing for movement toward and away from the center of the take up reel;
b. means for normally biasing the sensing arm toward the center of the take up reel;
c. and third switching means engageable by the sensing arm for breaking contact between the shutter means and electrical driving means and said source of electrical power as a function of sensing arm position.

11. The automatic camera defined by claim 10, and further comprising warning light means controlled by said third switching means for indicating the condition of less than said predetermined amount of film wound onto the take up reel.

12. The automatic camera defined by claim 1, and further comprising alarm means for sensing the amount of film on the film supply reel and for providing an indication when the film supply decreases to a first predetermined amount.

13. The automatic camera defined by claim 12, wherein said alarm means precludes operation of the shutter means and electrical driving means when the film supply decreases to a second predetermined amount less than the first predetermined amount.

14. The automatic camera defined by claim 13, wherein the shutter means is electrically actuated, and the alarm means comprises:
a. a sensing arm pivotally mounted on the camera housing for movement toward and away from the center of the film supply reel;
b. means for normally biasing the sensing arm toward the center of the film supply reel;
c. electrical indicator means;
d. third switching means engageable by the sensing arm for establishing and breaking contact between the electrical indicator means and said source of electrical power as a function of sensing arm position;
e. and fourth switching means engageable by the sensing arm for establishing and breaking contact between the shutter means and electrical driving means and said source of electrical power as a function of sensing arm position.

15. The automatic camera defined by claim 14, wherein the electrical indicator means comprises a warning light.

16. The automatic camera defined by claim 14, and further comprising second electrical indicator means operable by the fourth switching means for providing an indication when the film supply decreases to said second predetermined amount.

17. The automatic camera defined by claim 16, wherein the second electrical indicator means comprises a buzzer.

18. The automatic camera defined by claim 14, wherein:
a. the camera housing comprises a compartment closable by a door member, the mounting means and sensing arm disposed within said compartment;
b. and further comprising means operable against the biasing means for moving the sensing arm away from the supply reel when the door is opened.

19. The automatic camera defined by claim 12, wherein the shutter means is electrically actuated, and the alarm means comprises:
a. a sensing arm pivotally mounted on the camera housing for movement toward and away from the center of the film supply reel;
b. means for normally biasing the sensing arm toward the center of the film supply reel;
c. electrical indicator means;
d. and third switching means engageable by the sensing arm for establishing contact between the electrical indicator means and said source of electrical power as a function of sensing arm position.

20. An automatic camera adapted for connection to a source of electrical power, comprising:
a. a camera housing;
b. mounting means for rotatably receiving a film supply reel and a take up reel;
c. lens means;
d. electrically actuated shutter means operable in association with the lens means to take a picture;
e. means for automatically advancing the film from the supply reel to the take up reel relative to the lens means following operation of the shutter means;
f. control means for sensing the amount of film on the take up reel and for precluding operation of the shutter means until a predetermined amount has been wound thereon, the control means comprising i. a first sensing arm pivotally mounted on the camera housing for movement toward and away from the center of the take up reel;
ii. means for normally biasing the first sensing arm toward the center of the take up reel;
iii. first switching means engageable by the first sensing arm for breaking contact between the shutter means and automatic film advancing means and said source of electric power as a function of first sensing arm position;

iv. and warning light means controlled by said first switching means for indicating the condition of less than said predetermined amount of film wound onto the take up reel;
g. and alarm means for sensing the amount of film on the film supply reel and for providing an indication when the film supply decreases to a first predetermined amount, the alarm means comprising
 i. a second sensing arm pivotally mounted on the camera housing for movement toward and away from the center of the film supply reel;
 ii. means for normally biasing the second sensing arm toward the center of the film supply reel;
 iii. electrical indicator means;
 iv. and second switching means engageable by the second sensing arm for establishing contact between the electrical indicator means and said source of electrical power as a function of second sensing arm position.

21. An automatic camera adapted for connection to a source of electrical power, comprising:
a. a camera housing;
b. mounting means for rotatably receiving a film supply reel and a take up reel;
c. lens means;
d. electrically actuated shutter means operable in association with the lens means to take a picture;
e. means for automatically advancing the film from the supply reel to the take up reel relative to the lens means following operation of the shutter means;
f. control means for sensing the amount of film on the take up reel and for precluding operation of the shutter means until a predetermined amount has been wound thereon, the control means comprising i. a first sensing arm pivotally mounted on the camera housing for movement toward and away from the center of the take up reel;
 ii. means for normally biasing the first sensing arm toward the center of the take up reel;
 iii. and first switching means engageable by the first sensing arm for breaking contact between the shutter means and automatic film advancing means and said source of electric power as a function of first sensing arm position;
g. and alarm means for sensing the amount of film on the film supply reel and for providing an indication when the film supply decreases to a first predetermined amount, and for precluding operation of the shutter means and film advancing means when the film supply decreases to a second predetermined amount less than said first predetermined amount, the alarm means comprising
 i. a second sensing arm pivotally mounted on the camera housing for movement toward and away from the center of the film supply reel;
 ii. means for normally biasing the second sensing arm toward the center of the film supply reel;
 iii. electrical indicator means;
 iv. second switching means engageable by the second sensing arm for establishing contact between the electrical indicator means and said source of electrical power when the second sensing arm reaches a first position relative to the center of the film supply reel;
 v. and third switching means engageable by the second sensing arm for breaking electrical contact between the shutter means and film advancing means and said source of electrical power when the second sensing arm reaches a second position relative to the center of the film supply reel.

22. An automatic camera adapted for connection to a source of electrical power, comprising:
a. a camera housing;
b. lens means;
c. electrically actuated shutter means operable in association with the lens means to take a picture;
d. mounting means for receiving a film supply reel and a take up reel;
e. electrically actuated means for automatically advancing film from the supply reel to the take up reel relative to the lens means following operation of the shutter means;
f. and alarm means for sensing the amount of film on the film supply reel, for providing an indication when the film supply decreases to a first predetermined amount, and for precluding operation of the shutter means and film advancing means when the film supply decreases to a second predetermined amount less than said first predetermined amount, comprising
 i. a sensing arm pivotally mounted on the camera housing for movement toward and away from the center of the film supply reel;
 ii. means for normally biasing the sensing arm toward the center of the film supply reel;
 iii. electrical indicator means;
 iv. first switching means engageable by the sensing arm for establishing and breaking contact between the electrical indicator means and said source of electrical power as a function of sensing arm position;
 v. and second switching means engageable by the sensing arm for establishing and breaking contact between the shutter means and automatic film advancing means and said source of electrical power as a function of sensing arm position.

23. The automatic camera defined by claim 22, wherein the electrical indicator means comprises a warning light.

24. The automatic camera defined by claim 22, and further comprising second electrical indicator means operable by the second switching means for providing an indication when the film supply decreases to said second predetermined amount.

25. The automatic camera defined by claim 24, wherein the second electrical indicator means comprises a buzzer.

* * * * *